United States Patent [19]

Ezuka

[11] Patent Number: 5,250,889
[45] Date of Patent: Oct. 5, 1993

[54] VARIABLE RELUCTANCE RESOLVER

[75] Inventor: Yasuhiro Ezuka, Maebashi, Japan

[73] Assignee: NSK Ltd., Tokyo, Japan

[21] Appl. No.: 965,010

[22] Filed: Oct. 23, 1992

[30] Foreign Application Priority Data

Oct. 29, 1991 [JP] Japan .................... 3-283082

[51] Int. Cl.$^5$ ........................... H02M 5/38
[52] U.S. Cl. ............................ 318/661; 310/168;
341/116; 318/605
[58] Field of Search ............... 318/605, 661, 692;
340/870.34, 870.35, 870.36, 870.25; 364/730;
310/168; 341/116, 112

[56] References Cited

U.S. PATENT DOCUMENTS 4,700,189 10/1987 Welburn ............... 340/870.35
4,733,117 3/1988 Perrins ................ 310/162
4,794,511 12/1988 Lundin ................ 363/156

FOREIGN PATENT DOCUMENTS 1-31126 6/1989 Japan .
1-218344 8/1989 Japan .

Primary Examiner—Bentsu Ro
Attorney, Agent, or Firm—Shapiro and Shapiro

[57] ABSTRACT

A variable reluctance resolver comprises a rotor core and stator magnetic poles structured to enable reluctance in the space between the rotor core and stator magnetic poles to be changed by the positions of the rotor core and to make the fundamental wave component of the reluctance variation N cycles per revolution of the rotor core, N being an integer of 1 or more; first magnetic poles having a predetermined number 3N phases arranged at equal intervals on the stator magnetic poles; second magnetic poles having a predetermined number of 3N phases formed in the central positions between the first magnetic poles; excitation coils arranged individually between the first and second magnetic poles and connected in series to each other for each phase of the magnetic poles; a current change detecting device for detecting current value change due to the variation of the reluctance when an alternating current is applied to the magnetic coils of each phase of the magnetic poles; 3N difference value calculating devices for calculating the difference values between the detected current values of the first magnetic poles and second magnetic poles of each phase detected by the current change detecting device; a phase converting device for converting the output of the difference value of the difference value calculating device into a 2N-phase; and a signal processing device for calculating rotational angles or rotational speeds on the basis of the converted outputs of the phase converting device.

1 Claim, 3 Drawing Sheets

VARIABLE RELUCTANCE RESOLVER

BACKGROUND OF THE INVENTION

1. Field of the Invention

The present invention relates to an improvement for a variable reluctance resolver for the detection of angular positions and rotational speeds.

2. Related Background Art

As a conventional variable reluctance resolver, there has been known a resolver in which the rotor core and stator magnetic poles are structured to change reluctance in the space between them in accordance with the positions of the rotor core thereby to enable the fundamental component of the reluctance variation to be N cycles per revolution of the rotor core. The structure is arranged to detect the rotational angular positions and rotational speeds by detecting the foregoing reluctance variations. Particularly, as a variable reluctance resolver for an a.c. servo motor, there is known a resolver structured with the stator magnetic pole having three phases and eighteen poles.

The above-mentioned conventional variable reluctance resolvers generate permeance between the rotor and stator corresponding to the facing relations between the teeth formed on both of them, and due to the spatial higher harmonic wave present in this permeance, the positional detection accuracy per tooth becomes degraded. This necessitates the provision of a correction circuit composed of ROM, D/A converter and other components for its signal processing circuit As a result, not only it is impossible to miniaturize the circuit, but also it is impossible to arrange any random combinations between the motor and the signal processing circuit because the correction data in the ROM are defined for each of the resolvers to determine the combination between them. These problems are yet to be solved.

When the stator magnetic poles are structured with three phases and eighteen poles, the permeance can be expressed in the following equation (1):

$$P = P_0 + P_1\cos\theta + P_2\cos2\theta + P_3\cos3\theta + P_4\cos4\theta + P_5\cos5\theta\ldots \quad (1)$$

Here, $P_0 \neq P_1 \neq P_2 \neq P_3 \neq P_4 \neq P_5 \neq \ldots$

Also, the higher order components of more than $P_5$ are so minute that their influence on the accuracy can be ignored. Therefore, the above-mentioned equation (1) can be simplified and expressed in the following equation (2):

$$P = P_0 + \Sigma P_i\cos i\theta \quad (2)$$

Here, this is rearranged for the resolver signals fa ($\theta$), fb ($\theta$), and fc ($\theta$) of the three phases A, B and C and expressed as follows:

$$fa(\theta) = A_0 + A_1\cos\theta + A_2\cos2\theta + A_3\cos3\theta + A_4\cos4\theta \quad (3)$$

$$fb(\theta) = A_0 + A_1\cos(\theta - 120°) + A_2\cos2(\theta - 120°) + A_3\cos3(\theta - 120°) + A_4\cos4(\theta - 120°) \quad (4)$$

$$fc(\theta) = A_0 + A_1\cos(\theta + 120°) + A_2\cos2(\theta + 120°) + A_3\cos3(\theta + 120°) + A_4\cos4(\theta + 120°) \quad (5)$$

Then, if the phase conversion 3/2 is given to the above-mentioned equations (3) to (5), the signals to be inputted into the signal processing circuit are expressed in the following equations (6) and (7):

$$fc(\theta) = 3(A_1\cos\theta + A_2\cos2\theta + A_4\cos4\theta)/2 \quad (6)$$

$$fs(\theta) = 3(A_1\sin\theta - A_2\sin2\theta + A_4\sin4\theta)/2 \quad (7)$$

Therefore, in the signal processing circuit, the digital angle $\phi$, which will be expressed according the following equations (8) and (9), is calculated on the basis of the signals converted by the above-mentioned equations (6) and (7):

$$\theta = \theta + \Delta\theta \quad (8)$$

$$\Delta\theta = \tan^{-1}[(A_2 - A_4)\sin3\theta/\{A_1 + (A_2 + A_4)\cos3\theta\}] \quad (9)$$

As is clear from these equations (8) and (9), an error $\Delta\theta$ due to the spatial higher harmonic wave of the permeance is involved in the signal processing circuit. Consequently, a corrector is required for the signal processing circuit to correct the error $\Delta\theta$ due to the spatial higher harmonic wave.

In order to solve this problem, three stator teeth are provided at intervals of 120° each having three-phase alternating current excitation coil and output coil, respectively, as disclosed in Japanese Patent Laid-Open Application No. 1-218344, and a stator tooth having the same excitation coil and output coil in the reverse direction is provided at a position symmetrical to each of the phase stator teeth at an angle of 180°. They are given as an A set of stator teeth. Thus, it is conceivable that the permeance components of second to fourth higher harmonic waves can be reduced by providing six B sets stator teeth having the same coils as the A set at positions each displaced by 90° against the six set of the A set stator teeth. In this case, however, it is required to arrange two sets of excitation coil and output coil to input three-phase alternating current signals into the stator teeth individually; thus making it necessary to insulate the excitation coils and output coils. Accordingly, the structure becomes inevitably complicated such new that more time and labor are required for its assembly.

SUMMARY OF THE INVENTION

The present invention is, therefore, designed with a view to solving the problems described above. It is an object of the invention to provide a variable reluctance resolver capable of detecting the rotational angles or rotational speeds accurately with a simple structure, without being affected by any higher harmonic wave components of permeance.

In order to achieve the above-mentioned, object according to the present invention, there is provided a variable reluctance resolver, in which the rotor core and stator magnetic poles are structured to change reluctance in the space between the core and magnetic poles in accordance with the positions of the rotor core, to make fundamental component of the reluctance variation N (N being an integer of 1 or more) cycles per revolution of the rotor core, thereby to detect the rotational angular positions and rotational speeds by detecting the foregoing reluctance variations. The resolver is characterized in that it is provided with the following:

first magnetic poles having a predetermined number of 3N phases arranged at equal intervals for the foregoing stator;

second magnetic poles having a predetermined number of 3N phases formed in the central position between the aforesaid first magnetic poles;

excitation coils arranged individually between the foregoing first and second magnetic poles and connected in series to each other for each of the phases;

a current change detector for detecting electric current change due to the variation of the reluctance when an alternating current is applied to each of the phases of the magnetic coils;

3N difference value calculating devices for calculating the difference values between the current detection values of each phase of the first magnetic poles and second magnetic poles detected by the aforesaid current change detector;

a phase converter for converting the output of the difference value of the 3N-phase by the aforesaid difference value calculating device into that of a 2N-phase; and a signal processing device for calculating rotational angles or rotational speeds on the basis of the converted outputs of the aforesaid phase converter.

In the present invention, assuming N=1, for example, an alternating current is applied to the excitation coil of the first magnetic poles of each phase and the excitation coils of the second magnetic poles of each phase to change the current flowing in these excitation coils by the reluctance variation corresponding to the positional changes between the first and second magnetic poles and the rotor core. The excitation current thus changing is detected by the current change detector. Of the detected current values, the difference value between the detected current values of the first and second magnetic poles of the same phase is calculated by the three difference value calculating devices thereby to obtain among the permeance higher harmonic wave components a three-phase signal in which only the third higher harmonic wave distortion remains. It is then possible to offset the third higher harmonic wave distortion by converting this three-phase signal into a two-phase signal by means of the phase converter. Thus, the rotational angles or rotational speeds are accurately detected by inputting the phase conversion output into the signal processing circuit.

DETAILED DESCRIPTION OF THE PREFERRED EMBODIMENTS

Hereinafter, in conjunction with the accompanying drawings, the description will be made of the embodiments according to the present invention.

Figure 1:
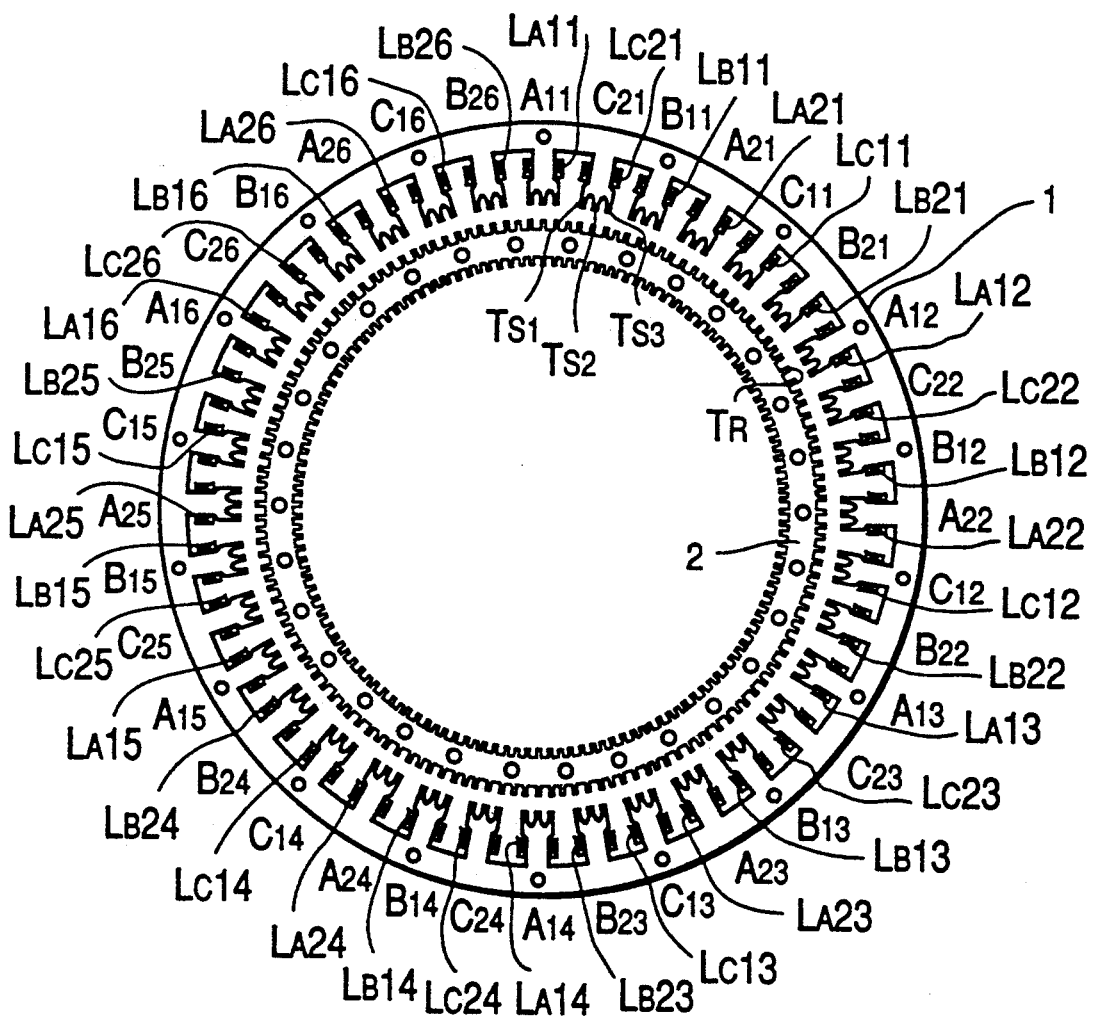
FIG. 1 is a cross-sectional view showing an embodiment according to the present invention.

FIG. 1 is a cross-sectional view showing an embodiment according to the present invention, which is structured with a cylindrical stator 1 and a rotor core 2 arranged rotatively in this stator 1.

On the inner periphery of the stator 1, first magnetic poles $A_{11}$ to $A_{16}$, $B_{11}$ to $B_{16}$, and $C_{11}$ to $C_{16}$ of N phases projected in the radial direction, three phases and eighteen poles, for example, are formed sequentially at given intervals. At the intermediate positions between each of these first magnetic poles $A_{11}$ to $A_{16}$, $B_{11}$ to $B_{16}$, and $C_{11}$ to $C_{16}$, the three-phase eighteen poles of second magnetic poles $A_{21}$ to $A_{26}$, $B_{21}$ to $B_{26}$, and $C_{21}$ to $C_{26}$, are formed. As shown in FIG. 1, the poles are arranged in the order marked as $A_{11}$ to $C_{21}$ to $B_{11}$ to $A_{21}$ to $C_{11}$ to $B_{21}$ to $A_{12}$ to $C_{22}$ etc. Then, for each of the magnetic poles $A_{11}$ to $C_{26}$ three teeth $T_{s1}$ to $T_{s3}$ are formed at the end face on its inner periphery side and a corresponding one of excitation coils $L_{A11}$ to $L_{c26}$ is wound. Because of this, the magnetic poles at positions of 180° are of the same phases.

Although not shown, rotor core 2 is integrally fixed to a rotational shaft on the inner periphery side. On the other periphery, slot teeth $T_R$ totaling 150 teeth are formed at equal intervals. Here, the pitches of the slot teeth $T_R$ of the rotor core 2 are assumed to be such that three teeth $T_R$ adjacent on another match, for example, the teeth $T_{s1}$ to $T_{s3}$ of the magnetic pole $A_{11}$ of the stator 1. The teeth $T_{s1}$ to $T_{s3}$ of the adjacent pole $C_{21}$ are formed so that a mechanical phase deviation is generated for an amount equivalent to a 1/36 pitch with respect to the slot teeth $T_R$ of the rotor 2.

Figure 2:
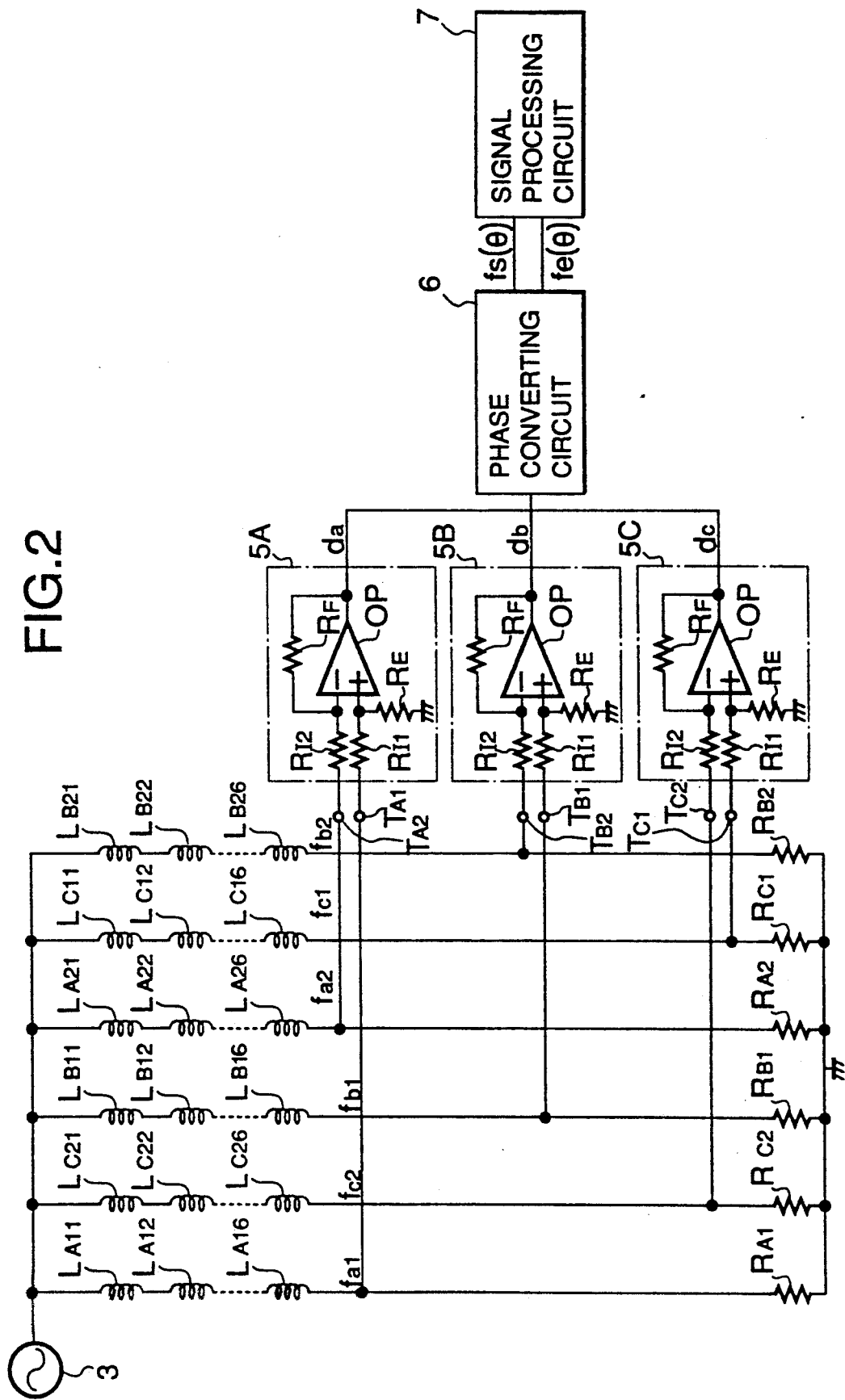
FIG. 2 is a circuit diagram showing the circuit structure in the embodiment shown in FIG. 1.

The excitation coils $L_{i11}$ to $L_{i16}$ of each of the first magnetic poles $i_{11}$ to $i_{16}$ (i=A, B and C) are connected in series while the excitation coils $L_{A11}$ to $L_{c11}$ are connected to a single phase alternating current power source 3 as shown in FIG. 2. Also, the excitation coils $L_{A16}$ to $L_{c16}$ are grounded through resistors $R_{A1}$ to $R_{c1}$. As further shown in FIG. 2, the excitation coils $L_{i21}$ to $S_{i26}$ of the remaining second magnetic poles $i_{21}$ to $i_{26}$ are connected in series, and the excitation coils $L_{A21}$ to $L_{c21}$ are connected to the single phase alternating current power source 3. The excitation coils $L_{A26}$ to $L_{c26}$ are grounded through resistors $R_{A2}$ to $R_{c2}$.

From the connecting points of the excitation coils $L_{A16}$ to $L_{c16}$ and $L_{A26}$ to $L_{c26}$ and resistors $R_{A1}$ to $R_{c1}$ and $R_{A2}$ to $R_{c2}$, there are extended output terminals $T_{A1}$ to $T_{c1}$ and $T_{A2}$ to $T_{c2}$ to output the i phase output signals $f_{a1}(\theta)$ to $f_{c1}(\theta)$ and $f_{a2}(\theta)$ to $f_{c2}(\theta)$ in response to the current variations by the reluctance changes between each of the magnetic poles and the slot teeth $T_R$ of the rotor core 2. These terminals are connected to the three differential amplifier circuits 5A to 5C serving as the difference value calculator consisting of operational amplifiers. For each of the differential amplifier circuits 5A to 5C, the non-inverting input side of the operational amplifier OP is connected to the output terminal $T_{i1}$ through a resistor $R_{i1}$, at the same time, being grounded through the resistor $R_E$. The inverting input side is connected to the output terminal $T_{i2}$ through the resistor $R_{i2}$ and a feedback resistor $R_F$ is inserted between the inverting input side and the output side so as to output a difference signal $f_i(\theta)$ represented by the difference value between the i phase output signals $f_{i1}(\theta)$ and $f_{i2}(\theta)$.

The three-phase alternating current voltage corresponding to the excitation current output from these differential amplifier circuits 5A to 5C is supplied to the 3/2 phase converting circuit 6 for converting the three-phase into a two-phase, and then the two-phase signals $f_c(\theta)$ and $f_s(\theta)$ output from this phase converting circuit 6 are supplied to the signal processing circuit 7 serving as the signal processor.

Figure 3:
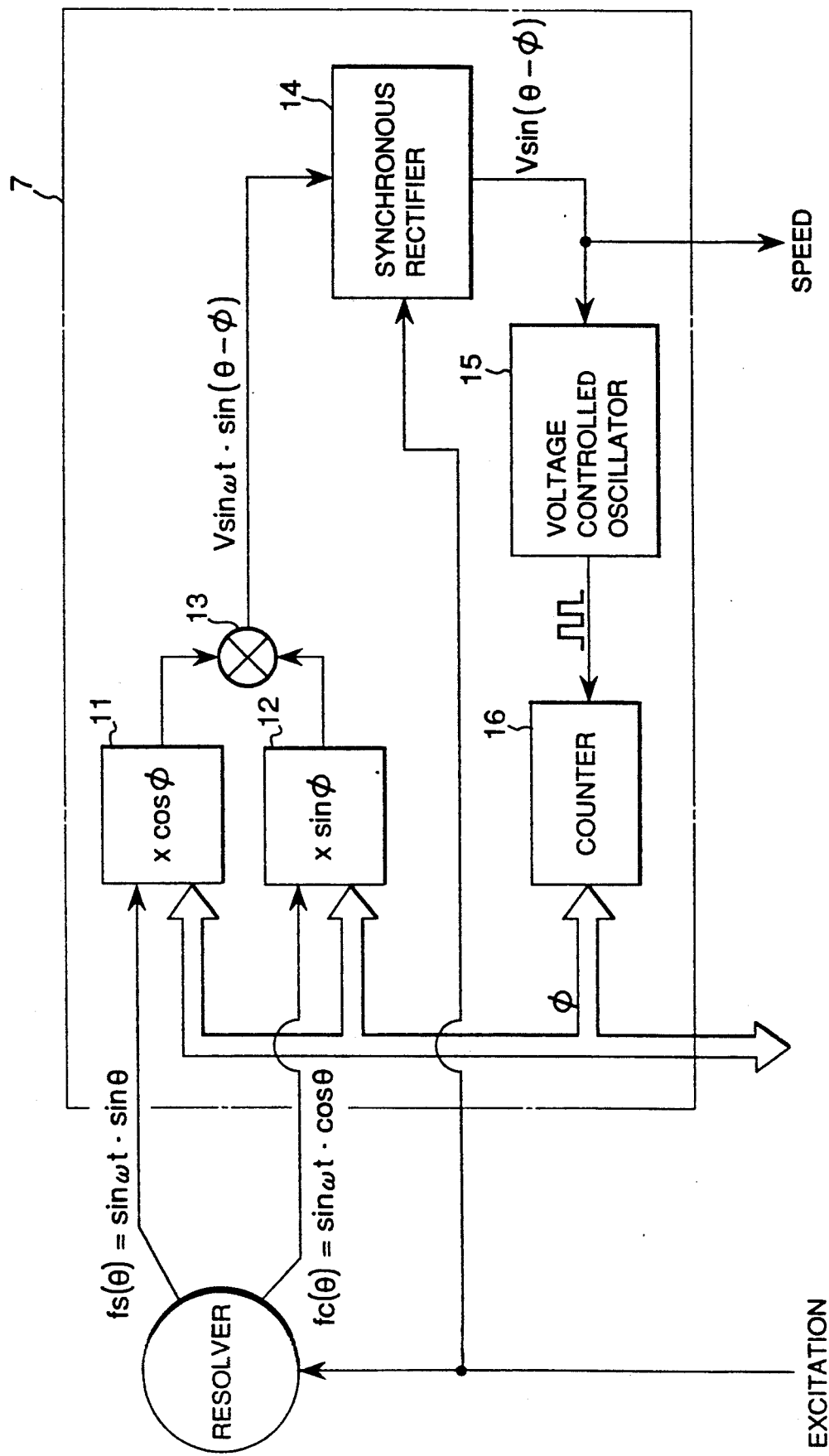
FIG. 3 is a block diagram showing an example of the signal processing circuit.

As shown in FIG. 3, this signal processing circuit 7 comprises multipliers 11 and 12 to which the two-phase signals $f_s(\theta)$ and $f_c(\theta)$ mentioned above are inputted each as a multiplicand individually and to which the digital rotational angle detection value $\phi$ is inputted as a multiplier from the counter 16 to be described later; a subtracter 13 to which the multiplicative outputs are inputted from these multipliers 11 and 12; a synchronous rectifier 14 to which the subtractive output is inputted from this subtracter 13 and to which the alternating current voltage from the excitation single-phase alternating current power source 3 is inputted as a synchronous signal; a voltage controlled oscillator 15 to which the output from this synchronous rectifier 14 is inputted; and a counter 16 to which the output pulse from this voltage controlled oscillator 15 is inputted. Thus, the output from the synchronous rectifier 14 is output as velocity signals, the digital values which represent the rotational angles being output from the counter 16.

Now, the description will be made of the operation of the above-mentioned embodiment. At first, when a single-phase alternating current is applied to the excitation coils $L_{A16}$ to $L_{c16}$ and $L_{A26}$ to $L_{c26}$ of each of the magnetic poles $A_{11}$ to $C_{26}$, the resolver signals $fa_1$ to $fc_1$ and $fa_2$ to $fc_2$ of each of the magnetic poles $L_{A16}$ to $L_{c16}$ and $L_{A26}$ to $L_{c26}$ can be expressed in the following equations (10) to (15):

$$fa_1(\theta) = A_0 + A_1\cos\theta + A_2\cos2\theta + A_3\cos3\theta + A_4\cos4\theta \quad (10)$$

$$fb_1(\theta) = A_0 + A_1\cos(\theta - 120°) + A_2\cos2(\theta - 120°) + A_3\cos3(\theta - 120°) + A_4\cos4(\theta - 120°) \quad (11)$$

$$fc_1(\theta) = A_0 + A_1\cos(\theta + 120°) + A_2\cos2(\theta + 120°) + A_3\cos3(\theta + 120°) + A_4\cos4(\theta + 120°) \quad (12)$$

$$fa_2(\theta) = A_0 + A_1\cos(\theta + 180°) + A_2\cos2(\theta + 180°) + A_3\cos3(\theta + 180°) + A_4\cos4(\theta + 180°) \quad (13)$$

$$fb_2(\theta) = A_0 + A_1\cos(\theta - 300°) + A_2\cos2(\theta - 300°) + A_3\cos3(\theta - 300°) + A_4\cos4(\theta - 300°) \quad (14)$$

$$fc_2(\theta) = A_0 + A_1\cos(\theta + 300°) + A_2\cos2(\theta + 300°) + A_3\cos3(\theta + 300°) + A_4\cos4(\theta + 300°) \quad (15)$$

Now, since each of the resolver signals $fa_1$ to $fc_1$ and $fa_2$ to $fc_2$ is supplied to the differential amplifier circuits 5A to 5C, the output signals da to dc from these differential amplifier circuits 5A to 5C can be expressed in the following equations (16) to (18):

$$da = 2A_1\cos\theta + 2A_3\cos3\theta \quad (16)$$

$$db = 2A_1\cos(\theta - 120°) + 2A_3\cos3(\theta - 120°) \quad (17)$$

$$dc = 2A_1\cos(\theta + 120°) + 2A_3\cos3(\theta + 120°) \quad (18)$$

From the differential amplifier circuits 5A to 5C, it is possible to obtain the three-phase signals da to dc having only the remaining third higher harmonic wave distortion among the permeance higher harmonic wave distortions.

Then, these three-phase signals da to dc are supplied to the phase conversion circuit 6 to be converted into the two-phase alternating current signal fc ($\theta$) and fs ($\theta$) which offset the third higher harmonic wave distortions to be expressed in the following equations (19) and (20):

$$fc(\theta) = 3A_1\cos\theta/2 = \sin\omega t \cdot \cos\theta \quad (19)$$

$$fs(\theta) = 3A_1\sin\theta/2 = \sin\omega t \cdot \sin\theta \quad (20)$$

These two-phase alternating current signals fc ($\theta$) and fs ($\theta$) are supplied to the signal processing circuit 7. In this signal processing circuit 7, the counter 16 is cleared in its initial state and thus the digital rotational angle $\phi$ is set at zero accordingly.

Therefore, the multiplicative output of the multiplier 11 becomes $\sin\omega t \cdot \sin\theta$ while the multiplicative output of the multiplier 12 becomes zero. Thus, the subtractive output of the subtracter 13, that is, $V\sin\omega t \cdot \sin(\theta - \phi)$ becomes $V\sin\omega t \cdot \sin\theta$. This is supplied to the synchronous rectifier 14. Hence, the output $V\sin 0$, the excitation voltage component of which has been removed by this synchronous rectifier, is output. This is output to an external processing circuit as the velocity detection signal. Simultaneously, it is supplied to the voltage controlled oscillator 15 to be converted into pulse signals, corresponding to the voltage, for being supplied to the counter 16. Therefore, the counted value $\phi$ of this counter 16 becomes a value equal to the phase angle $\theta$.

In this state, when the rotor 2 continuously rotates in the same direction, the output of the subtracter 13 is increased by the increased portion for the rotational angle $\phi$ of the phase angle $\theta$ and the output of the synchronous rectifier 14 is also increased by the increased portion of the phase angle $\theta$ in response thereto. Therefore, the counted value of the counter 16 is counted up by the increased portion of the phase angle $\theta$ to output the current rotational angle $\phi$ in accordance with the rotation of the rotor 2.

Here, in the above-mentioned embodiment, while the description has been made of the case where the two signals for the rotational speed and rotational angle can be obtained in the signal processing circuit 7, the present invention is not limited thereto. In order to obtain only the rotational angle $\phi$, it may be possible to work it out by providing a calculating circuit for executing the following equation (21):

$$\phi = \tan^{-1}(fs(\theta)/fc(\theta)) \quad (21)$$

Also, in the above-mentioned embodiment, while the description has been made of the case where the first magnetic poles $A_{11}$ to $C_{16}$ of three phases and eighteen poles and likewise the second magnetic poles $A_{21}$ to $C_{26}$ of three phases and eighteen poles are formed in the stator 1, the present invention is not limited thereto. It may be possible to form first and second magnetic poles having the numbers of phases and magnetic poles which are integral times those numbers.

Further, the signal processing circuit 7 it is not confined to an electronic circuit, but it may be possible to employ a microcomputer for the required operations.

As described above, according to the present invention, an alternating current is supplied to the excitation coils of the first 3N-phase magnetic poles and the excitation coils of the second 3N-phase magnetic poles in the stator, and the excitation current, which is being changed due to the reluctance variation in the current flow to these excitation coils in response to the positional changes between the first and second magnetic poles and the rotor core, is detected by the current change detector. Of these current detected values, the difference value between the current detection values of the first and the second magnetic poles of the same phase are calculated by three difference value calculating devices. Thus, among the permeance higher wave distortions the three-phase signal in which only third higher harmonic wave distrotion remains is obtained. With the phase converter, this three-phase signal is converted into a two-phase signal to offset the third higher harmonic wave distrotion and then the phase output thus converted is inputted into the signal processing circuit, hence obtaining the effect that the rotational angles or rotational speeds of the rotor are detected accurately without being affected by the permeance higher harmonic wave distortion.

What is claimed is:

1. A variable reluctance resolver comprising:

a rotor core and stator magnetic poles structured to enable reluctance in a space between the rotor core and stator magnetic poles to be changed by the positions of the rotor core and to make a fundamental wave component of the reluctance variation N cycles per revolution of the rotor core, N being an integer of 1 or more;

said stator magnetic poles including first magnetic poles having a predetermined number of 3N phases and arranged at equal intervals;

said stator magnetic poles further including second magnetic poles having a predetermined number of 3N phases and disposed at the central positions between said first magnetic poles;

excitation coils arranged individually at said first and second magnetic poles and connected in series to each other for each phase of said first magnetic poles and for each phase of said second magnetic poles;

current detecting means for detecting current values changing due to the variation of the reluctance when an alternating current is applied to the magnetic coils of each phase of said first magnetic poles and said second magnetic poles;

3N difference value calculating means for calculating the difference values between the detected current values of said first magnetic poles and second magnetic poles of each phase detected by said current detecting means;

phase converting means for converting outputs of the difference values from said difference value calculating means into a 2N-phase output; and signal processing means for calculating rotational angles or rotational speeds on the basis of the converted output of said phase converting means.

* * * * *